R. C. COLE.
BOX FASTENING.
APPLICATION FILED MAR. 30, 1917.
1,234,133.
Patented July 24, 1917.
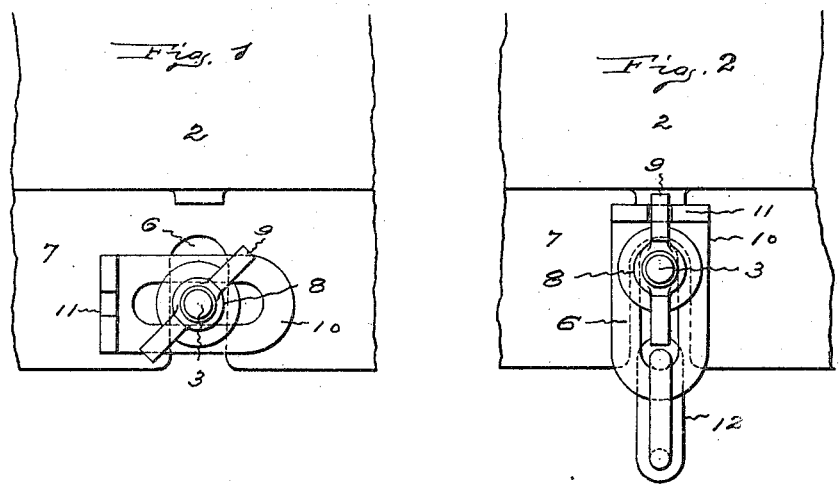
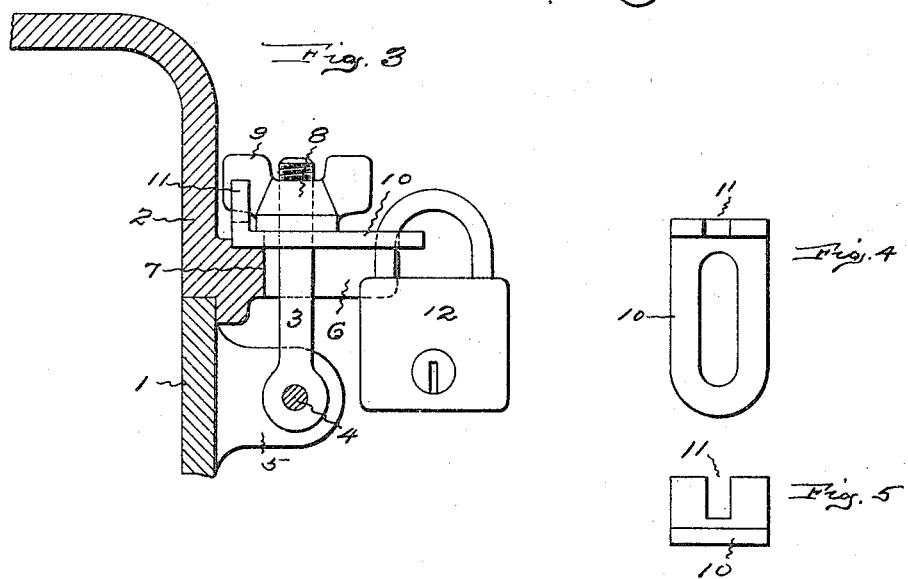
Inventor:
Robert C. Cole by
Harry R. Williams
atty.

UNITED STATES PATENT OFFICE.

ROBERT C. COLE, OF HARTFORD, CONNECTICUT, ASSIGNOR TO THE JOHNS-PRATT COMPANY, OF HARTFORD, CONNECTICUT, A STATUTE CORPORATION OF CONNECTICUT.

BOX-FASTENING.

1,234,133. Specification of Letters Patent. Patented July 24, 1917.

Application filed March 30, 1917. Serial No. 158,580.

*To all whom it may concern:*

Be it known that ROBERT C. COLE, a citizen of the United States, residing at Hartford, in the county of Hartford and State of Connecticut, have invented a new and useful Improvement in Box-Fastening, of which the following is a specification.

This invention relates to means for fastening together two parts of a box or the cover to a wall of a box.

The object of the invention is to provide a simple, cheap, easily manipulated means for fastening together the top or lid of a box to the bottom of the box, which means is so designed that it can be readily secured by an ordinary padlock or common seal and unwarranted access to the box be prevented.

The invention is particularly useful for securing together the opening parts of an electric switch container or cut-out box, or electric meter casing. It has been common to fasten together the separable parts of a box, container or casing by a bolt hinged to one part and designed to be swung into a notch or slot in a flange or between ears on the other part, the bolt bearing a thumb nut and sometimes a washer beneath the nut which, when screwed onto the bolt against the walls of the flange or ears, holds the bolt from swinging out of the slot or notch and thus secures the parts together. In attaining the object of the present invention a slotted washer or plate is arranged to slide on the bolt beneath the nut and this washer is provided with a lug or a fork which, when the washer is slid so as to carry the lug or fork away from the bolt, allows the nut to turn freely, but when the washer is slid so as to carry the lug or fork toward the bolt engages the nut and prevents it from turning. The slot in the washer besides allowing the washer to slide on the bolt is adapted to receive the bail or shank of a locking padlock or seal, and as a portion of the lock when hung on the washer will lie in the notch or slot through which the bolt extends the washer cannot be turned so that the fork can be slid away from the nut and allow it to be unscrewed for releasing the bolt, as long as the lock is on the washer.

Figure 1 of the accompanying drawings shows a plan of a fastening means applied to the edges of a box, the washer being shown in this view in such position that the nut can be freely turned on the bolt for fastening together or releasing the parts of the box. Fig. 2 shows a plan of the same with the parts locked together. Fig. 3 shows a side elevation of the locking means in use. Fig. 4 shows a plan of the sliding washer, and Fig. 5 shows an end view of the washer.

In the views the fastening means is shown as applied to the separable edges of a metal box 1 and its cover 2. The bolt 3 is hinged on pin 4 between ears 5 that project from the outside of the box near its upper edge. The bolt swings on its pivot into or out of a slot 6 in the flange 7 that projects from the outside near the lower edge of the cover. On the threaded swinging end of the bolt is a thumb nut 8 with wings 9. When the nut is screwed down on the bolt the cover is drawn down tightly to the bottom of the box. When the nut is unscrewed the bolt and the nut can be swung outward so as to release the cover and allow it to be opened from the box. This is a common and largely used means for fastening together two parts which it is desired to be able to open easily and quickly.

In carrying out the present invention a slotted plate or washer 10 is placed on the bolt beneath the nut. This has one end extending upward and the upward extending end is notched so as to provide a fork 11, the opening in this fork being of a size to receive the wings of the nut. When the washer is slid on the bolt so that the fork is carried away from the wings of the nut, as shown in Fig. 1, the nut can be turned on the bolt as usual, and when screwed down the plate acts as an ordinary washer. However, if it is desired to lock the parts together so that the box cannot be opened without the proper key or implement after the nut has been screwed down on the bolt the washer is slid so as to carry the fork in toward the bolt until the fork embraces one of the wings of the nut, when the nut and washer are turned until the slot in the washer extends parallel with the notch or slot in the flange, as shown in Fig. 2. With the parts in this position if the hasp or bail of a padlock is looped through the slot in the washer the washer cannot be turned and as it cannot be turned the nut cannot be turned, and as the nut cannot be turned the bolt cannot be released so as to unfasten the cover from the bottom of the box (Fig. 3).

When the padlock is removed the washer and nut are free to be turned, then the washer may be slid along until the nut is freed from the fork, after which the nut can be turned so as to release the bolt and allow it to be swung over for unfastening the top of the box. The lock may or may not be used as desired. The parts can be fastened together without the lock, but if it is desired to seal the parts the lock can be used.

The invention claimed is:

1. A box fastening consisting of a bolt hinged to one part of the box, a nut turning on the threaded swinging end of the bolt and adapted to engage another part of the box, a washer with an elongated slot that is closed at both ends arranged to turn and slide on the bolt beneath the nut, and means carried by the washer and adapted to engage and prevent the nut from turning when the end of the washer carrying said means is slid into engagement with a part of the box and is itself held from turning.

2. A box fastening consisting of a bolt hinged to one part of the box, a thumb nut turning on the threaded swinging end of the bolt and adapted to engage another part of the box, and a washer with an elongated slot that is closed at both ends arranged to turn and slide on the bolt beneath the nut, said washer having a fork which is adapted to embrace a portion of the thumb nut and prevent it from turning when the forked end of the washer is slid into engagement with a part of the box and is itself held from turning.

3. A box fastening consisting of a bolt hinged to a projection from one part of the box and adapted to be swung into and out of an opening in a projection from another part of the box, a nut turning on the threaded swinging end of the bolt, a washer with an elongated slot movable on the bolt beneath the nut, and means carried by the washer and adapted to engage and prevent the nut from turning when the end of the washer carrying said means is moved into engagement with a part of the box and a portion of said slot lies in line with the opening in the box into which the bolt is swung.

4. A box fastening consisting of a bolt hinged to a projection from one part of the box and adapted to be swung into and out of an opening in a projection from another part of the box, a nut turning on the threaded swinging end of the bolt, a washer with an elongated slot that is closed at both ends movable on the bolt beneath the nut, means carried by the washer and adapted to engage and prevent the nut from turning when the end of the washer carrying said means is moved into engagement with a part of the box and a portion of said slot lies in line with the opening in the box into which the bolt is swung, and locking means adapted to be passed through the slot in the washer and the opening in the box to prevent the washer from turning.

ROBERT C. COLE.

Copies of this patent may be obtained for five cents each, by addressing the "Commissioner of Patents, Washington, D. C."